US012445504B2

United States Patent
Bao

(10) Patent No.: US 12,445,504 B2
(45) Date of Patent: Oct. 14, 2025

(54) PROXY COMMUNICATION METHOD AND DEVICE, AND NETWORK DEVICE

(71) Applicant: DATANG MOBILE COMMUNICATIONS EQUIPMENT CO., LTD., Beijing (CN)

(72) Inventor: Chenxi Bao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 313 days.

(21) Appl. No.: 17/912,003

(22) PCT Filed: Mar. 23, 2021

(86) PCT No.: PCT/CN2021/082302
§ 371 (c)(1),
(2) Date: Sep. 15, 2022

(87) PCT Pub. No.: WO2021/197127
PCT Pub. Date: Oct. 7, 2021

(65) Prior Publication Data
US 2023/0143244 A1     May 11, 2023

(30) Foreign Application Priority Data
Apr. 3, 2020   (CN) .......................... 202010260715.6

(51) Int. Cl.
*H04L 65/1046* (2022.01)
*H04L 41/342* (2022.01)
(Continued)

(52) U.S. Cl.
CPC ........ *H04L 65/1046* (2013.01); *H04L 41/342* (2022.05); *H04L 67/30* (2013.01);
(Continued)

(58) Field of Classification Search
CPC ............. H04L 41/0836; H04L 41/0886; H04L 41/342; H04L 41/5058; H04L 65/1045; H04L 65/1046
See application file for complete search history.

(56) References Cited

U.S. PATENT DOCUMENTS 7,191,180 B2 *    3/2007  Evans ..................... H04L 67/06
2019/0020549 A1 * 1/2019  Kim ......................... H04L 41/12
(Continued)

FOREIGN PATENT DOCUMENTS

CN          111770122 A    10/2020
WO       2019062596 A1     4/2019
(Continued)

OTHER PUBLICATIONS

Extended European Search Report for the corresponding European Patent Application No. 21780497.0 issued by the European Patent Office on Nov. 14, 2023.
(Continued)

*Primary Examiner* — Zhensheng Zhang
(74) *Attorney, Agent, or Firm* — Ladas & Parry, LLP

(57) ABSTRACT

The present disclosure provides a proxy communication method, a proxy communication device and a network device. The proxy communication method includes transmitting a management request to an NRF entity, and the management request includes at least one of a registration request, a profile update request or a de-registration request.

14 Claims, 7 Drawing Sheets

(51) Int. Cl.
  *H04L 67/30* (2022.01)
  *H04W 60/04* (2009.01)
  *H04W 60/06* (2009.01)
  *H04W 84/04* (2009.01)

(52) U.S. Cl.
  CPC .......... *H04W 60/04* (2013.01); *H04W 60/06* (2013.01); *H04W 84/042* (2013.01)

(56) References Cited

U.S. PATENT DOCUMENTS

2020/0036754 A1* 1/2020 Livanos ................ H04W 48/16
2020/0228613 A1   7/2020 Han

FOREIGN PATENT DOCUMENTS

| WO | 2019071584 A1 | 4/2019 |
|---|---|---|
| WO | 2020038151 A1 | 2/2020 |

OTHER PUBLICATIONS

International Search Report for PCT/CN2021/082302 issued on Jul. 6, 2021 and its English Translation provided by WIPO.
Written Opinion for PCT/CN2021/082302 issued on Jul. 5, 2021 and its English Translation provided by WIPO.
International Report on Patentibily for PCT/CN2021/082302 issued on Sep. 29, 2022 and its English translation provided by WIPO.
"SCP registration in NRF," 3GPP TSG-SA WG2 Meeting #135, S2-1908783, Source to WG: Huawei, HiSilicon, Source to TSG: SA2, Oct. 14-18, 2019, Split Croatia, all pages.
"SCP registration in NRF", 3GPP TSG-SA WG2 Meeting #135, S2-1908784, Oct. 14-18, 2019, Split Croatia, Source to WG: Huawei, HiSilicon, Source to TSG: SA2, all pages.
"SCP as consumer of NRF," 3GPP TSG-SA WG2 Meeting #136, S2-1911277, Reno, NV, USA, Nov. 18-22, 2019, Source to WG: Huawei, HiSilicon, Source to TSG: SA2, all pages.

* cited by examiner transmitting, by a first proxy entity, an NF discovery query request to an NRF or subscribing a status notification service on the NRF, so as to obtain profile information about a newly-added target NF and related second proxy entities ~ S510 determining, by the first proxy entity, a next-hop route in accordance with an existing configuration capability parameter in a current NF profile, the profile information about the newly-added NF and the second proxy entities, its own profile information and the network policy, the next-hop route including a target NF or one of the second proxy entities ~ S520

FIG. 11 obtaining a management request from a proxy entity, the management request including at least one of a registration request, a profile update request or a de-registration request ~ S1201

FIG. 12

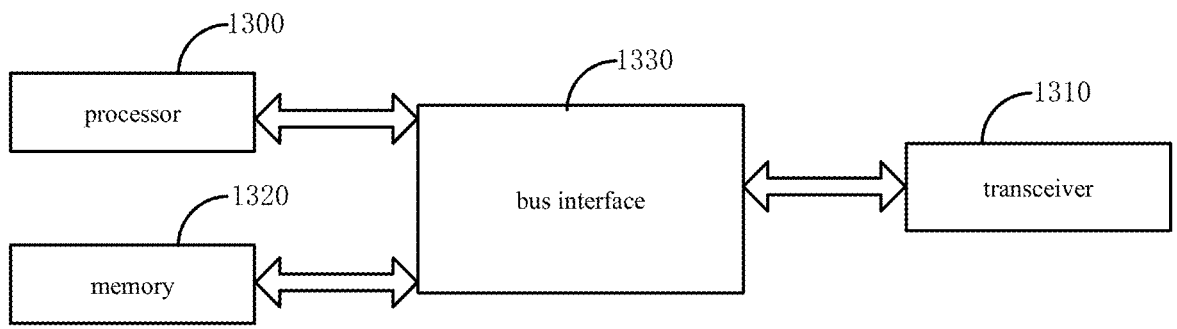

FIG. 13

PROXY COMMUNICATION METHOD AND DEVICE, AND NETWORK DEVICE

CROSS-REFERENCE TO RELATED APPLICATIONS

This application is the U.S. national phase of PCT Application No. PCT/CN2021/082302 filed on Mar. 23, 2021, which claims a priority to the Chinese patent application No. 202010260715.6 filed on Apr. 3, 2020, the disclosures of which are incorporated herein by reference in their entireties.

TECHNICAL FIELD

The present disclosure relates to the field of core network technology, in particular to a proxy communication method, a proxy communication device, and a network device.

BACKGROUND

In a conventional communication standard, a proxy, e.g., a Service Communication Proxy (SCP) or a Security Edge Protection Proxy (SEPP), does not has its own service, and it is a not a Network Function (NF), so it is impossible for the proxy to register its own service on a Network Repository Function (NRF) like the NF. In the related art, the proxy is manually configured on a relevant NF, and it is impossible to dynamically update the proxy, resulting in a lack of extendibility. In addition, in the case of multi-proxy deployment, a complicated routing problem may occur.

SUMMARY

An object of the present disclosure is to provide a proxy communication method, a proxy communication device and a network device, so as to enable a proxy to perform registration and routing on an NRF on its own initiative.

In one aspect, the present disclosure provides in some embodiments a proxy communication method for a proxy entity, including transmitting a management request to an NRF entity, the management request including at least one of a registration request, a profile update request or a de-registration request.

In some possible embodiments of the present disclosure, the registration request includes profile information about the proxy entity.

In some possible embodiments of the present disclosure, the profile information includes at least one of a proxy type, an instance Identifier (ID), a Public Land Mobile Network (PLMN) ID, address information, configuration capability, function information about the proxy, network status information about a network where the proxy entity is located, or entity information about a peripheral servable network entity.

In some possible embodiments of the present disclosure, the transmitting the management request to the NRF entity includes one of transmitting the management request to the NRF entity through an NF management service, or transmitting the management request to the NRF entity through a proxy management service.

In some possible embodiments of the present disclosure, when the management request is transmitted to the NRF entity through the NF management service and the management request includes the registration request, the registration request includes an NF type field for recording the proxy type of the proxy entity, an NF instance ID field for recording the instance ID of the proxy entity, a blank name field of service information about the NF, and an added field for recording the function information about the proxy, the network status information about the network where the proxy entity is located and the entity information about the peripheral servable network entity.

In some possible embodiments of the present disclosure, when the management request is transmitted to the NRF entity through the proxy management service and the management request includes the registration request, the registration request includes a proxy type field for recording the proxy type of the proxy entity, a proxy instance ID field for recording the instance ID of the proxy entity, a name field of the function information about the proxy for recording the function information about the proxy entity, a PLMN ID field for recording the PLMN ID of the proxy entity, and a proxy profile field for recording the configuration capability of the proxy entity, the network status information about the network where the proxy entity is located, and the entity information about the peripheral servable network entity.

In some possible embodiments of the present disclosure, in the registration request, the entity information about the peripheral servable network entity is blank or a preset value.

In some possible embodiments of the present disclosure, the proxy communication method further includes transmitting a routing query request to the NRF through an NF discovery service, and a field in the routing query request for requesting to obtain a target route type is recorded as the NF or proxy.

In some possible embodiments of the present disclosure, the proxy communication method further includes obtaining response information returned by the NRF in accordance with the routing query request, the response information includes a target network entity, and the target network entity includes a target NF and/or a target proxy.

In some possible embodiments of the present disclosure, the proxy communication method further includes obtaining an NR status notification message from the NRF entity, and the NF status notification message includes updated profile information about the target NF and/or the target proxy.

In some possible embodiments of the present disclosure, when the profile information in the registration request includes the entity information about the peripheral servable network entity, the proxy communication method further includes: updating the entity information about the peripheral servable network entity in accordance with the target NF and/or the target proxy; and transmitting the profile update request to the NRF entity so as to update the entity information about the peripheral servable network entity.

In some possible embodiments of the present disclosure, the proxy communication method further includes determining next-hop routing information in accordance with at least one of the profile information about the target NF and/or the target proxy in the response information, the profile information about the target NF and/or the target proxy in the NF status notification message, own profile information, or a network policy.

In another aspect, the present disclosure provides in some embodiments a proxy communication method for an NRF entity, including obtaining a management request from a proxy entity, the management request including at least one of a registration request, a profile update request or a de-registration request.

In some possible embodiments of the present disclosure, the registration request includes profile information about the proxy entity.

In some possible embodiments of the present disclosure, the profile information includes at least one of a proxy type, an instance ID, a PLMN ID, address information, configuration capability, function information about the proxy, network status information about a network where the proxy entity is located, or entity information about a peripheral servable network entity.

In some possible embodiments of the present disclosure, the obtaining the management request from the proxy entity includes one of obtaining the management request from the proxy entity through an NF management service, or obtaining the management request from the proxy entity through a proxy management service.

In some possible embodiments of the present disclosure, when the management request is obtained from the proxy entity through the NF management service and the management request includes the registration request, the registration request includes an NF type field for recording the proxy type of the proxy entity, an NF instance ID field for recording the instance ID of the proxy entity, a blank name field of service information about the NF, and an added field for recording the function information about the proxy, the network status information about the network where the proxy entity is located and the entity information about the peripheral servable network entity.

In some possible embodiments of the present disclosure, when the management request is obtained from the proxy entity through the proxy management service and the management request includes the registration request, the registration request includes a proxy type field for recording the proxy type of the proxy entity, a proxy instance ID field for recording the instance ID of the proxy entity, a name field of the function information about the proxy for recording the function information about the proxy entity, a PLMN ID field for recording the PLMN ID of the proxy entity, and a proxy profile field for recording the configuration capability of the proxy entity, the network status information about the network where the proxy entity is located, and the entity information about the peripheral servable network entity.

In some possible embodiments of the present disclosure, in the registration request, the entity information about the peripheral servable network entity is blank or a preset value.

In some possible embodiments of the present disclosure, the proxy communication method further includes recording request information in the management service, and transmitting response information to the proxy entity in response to the management request.

In some possible embodiments of the present disclosure, the proxy communication method further includes obtaining a routing query request transmitted by the proxy entity through an NF discovery service, and a field in the routing query request for requesting to obtain a target route type is recorded as the NF or proxy.

In some possible embodiments of the present disclosure, the proxy communication method further includes transmitting an information query request for a target NF and/or a target proxy to another NRF entity in accordance with the routing query request.

In some possible embodiments of the present disclosure, the proxy communication method further includes transmitting response information to the proxy entity in response to the routing query request, the response information includes a target network entity, and the target network entity includes a target NF and/or a target proxy.

In some possible embodiments of the present disclosure, the proxy communication method further includes transmitting an NR status notification message to the proxy entity in accordance with a status subscription service requested by the proxy entity during the registration, and the NF status notification message includes updated profile information about the target NF and/or the target proxy.

In yet another aspect, the present disclosure provides in some embodiments a network device, including a transceiver, a memory, a processor, and a program stored in the memory and executed by the processor. The processor is configured to read the program in the memory, so as to transmit a management request to an NRF entity, and the management request includes at least one of a registration request, a profile update request or a de-registration request.

In still yet another aspect, the present disclosure provides in some embodiments a network device, including a transceiver, a memory, a processor, and a program stored in the memory and executed by the processor. The processor is configured to read the program in the memory, so as to obtain a management request from a proxy entity, and the management request includes at least one of a registration request, a profile update request or a de-registration request.

In still yet another aspect, the present disclosure provides in some embodiments a proxy communication device for a proxy entity, including a request transmission module configured to transmit a management request to an NRF entity, the management request including at least one of a registration request, a profile update request or a de-registration request.

In still yet another aspect, the present disclosure provides in some embodiments a proxy communication device for a NRF entity, including a request obtaining module configured to obtain a management request from a proxy entity, the management request including at least one of a registration request, a profile update request or a de-registration request.

In still yet another aspect, the present disclosure provides in some embodiments a processor-readable storage medium storing therein a program. The program is executed by a processor so as to implement the steps of the above-mentioned proxy communication method.

The present disclosure at least has the following beneficial effect.

According to the proxy communication method in the embodiments of the present disclosure, the proxy entity is registered, updated and/or de-registered on the NRF on its own initiative, so it is able for the proxy to perform the registration and routing on the NRF on its own initiative without any manual configuration like that in the related art, thereby to reduce the human cost remarkably.

BRIEF DESCRIPTION OF THE DRAWINGS

FIG. 11 is a flow chart of the proxy communication method according to a tenth embodiment of the present disclosure;

FIG. 12 is a flow chart of a proxy communication method according to some embodiments of the present disclosure;

FIG. 13 is a schematic view showing a network device according to some embodiments of the present disclosure;

DETAILED DESCRIPTION

In order to make the objects, the technical solutions and the advantages of the present disclosure more apparent, the present disclosure will be described hereinafter in a clear and complete manner in conjunction with the drawings and embodiments.

In the related art, a proxy is merely capable of being manually configured on an NF, and it is impossible to dynamically update the proxy, resulting in the lack of extendibility. In addition, during the multi-proxy deployment, a complicated routing problem may occur. An object of the present disclosure is to provide a proxy communication method, so as to enable a proxy entity to be registered, updated and/or de-registered on an NRF on its own initiative, and enable a proxy to perform the registration and routing on the NRF on its own initiative without any manual configuration like that in the related art, thereby to reduce the human cost remarkably.

Figure 1:
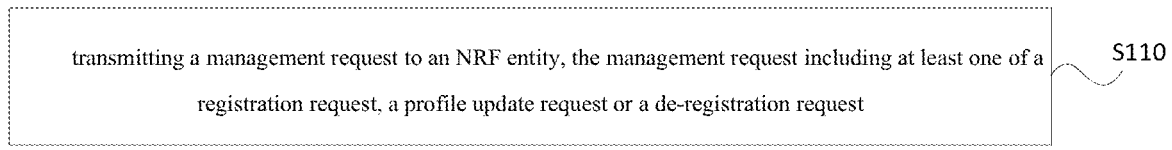
FIG. 1 is a flow chart of a proxy communication method according to some embodiments of the present disclosure.

The present disclosure provides in some embodiments a proxy communication method for a proxy entity which, as shown in FIG. 1, includes S110 of transmitting a management request to an NRF entity, the management request including at least one of a registration request, a profile update request or a de-registration request.

In some possible embodiments of the present disclosure, the management request includes one of the registration request, the profile update request and the de-registration request.

In some possible embodiments of the present disclosure, the management request includes the registration request, the profile update request and the de-registration request. When the management request includes the registration request, the profile update request and the de-registration request, subsequent to transmitting, by the proxy entity, the registration request to the NRF entity, the proxy communication method further includes transmitting the profile update request and/or the de-registration request to the NRF entity.

In some possible embodiments of the present disclosure, the registration request includes profile information about the proxy entity.

In some possible embodiments of the present disclosure, the profile information includes at least one of a proxy type, an instance ID, a PLMN ID, address information, configuration capability, function information about the proxy, network status information about a network where the proxy entity is located, or entity information about a peripheral servable network entity.

Further, S110 of transmitting the management request to the NRF entity includes a first mode of transmitting the management request to the NRF entity through an NF management service, or a second mode of transmitting the management request to the NRF entity through a proxy management service.

In the first mode, when the management request is transmitted to the NRF entity, the proxy entity is equivalent to an NF where a service is blank, and the management request is transmitted to the NRF through the NF management service.

In the second mode, when the management request is transmitted to the NRF entity, a new NRF service, i.e., the proxy management service, is defined for the registration, update and/or de-registration of the proxy.

The specific ways of transmitting, by the proxy entity, the registration request, the profile update request and the de-registration request to the NRF entity in S110 will be described hereinafter in more details.

It should be appreciated that, in the embodiments of the present disclosure, the proxy entity includes, but not limited to, an SCP and/or an SEPP. In order to clearly describe a specific procedure of the proxy communication method, the following description will be given when the proxy entity is an SCP. However, it should be appreciated that, the proxy communication method is not limited to applied to the registration, update and de-registration of the SCP, and it may be applied to the other proxy entities, which also falls within the scope of the present disclosure.

First Embodiment

In S110, the proxy entity transmits the registration request to the NRF entity in the first mode.

In this mode, the proxy entity is an SCP, and when it accesses to a network, it is equivalent to an NF where a service is blank. Like the other NF, it needs to perform the information registration on the NRF through an NF registration request of NF management.

Figure 2:
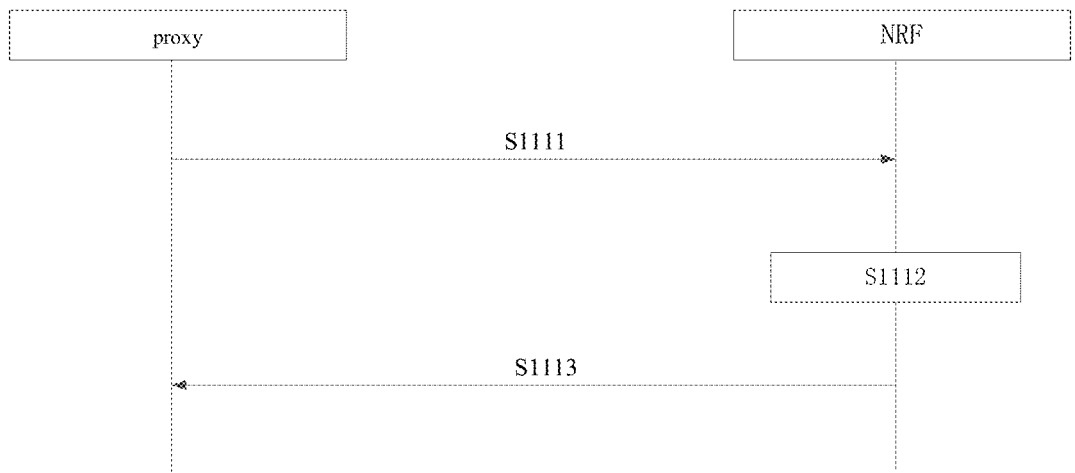
FIG. 2 is a flow chart of the proxy communication method according to a first embodiment of the present disclosure.

To be specific, as shown in FIG. 2, the transmitting, by the proxy entity, the registration request includes S1111 of transmitting, by the proxy, the NF registration request, i.e., the management request in S110, of NF management to the NRF.

In some possible embodiments of the present disclosure, the NF registration request includes a proxy type, an instance ID, a PLMN ID, address information, configuration capability, function information about the proxy, network status information about a network where the proxy entity is located, and entity information about a peripheral servable network entity.

The NF registration request of NF management includes an NF type field for recording the proxy type of the proxy entity, an NF instance ID field for recording the instance ID of the proxy entity, a blank name field of service information about the NF, and an added field for recording the function information about the proxy, the network status information about the network where the proxy entity is located and the entity information about the peripheral servable network entity.

To be specific, when the proxy type is SCP, the NF type field is newly added with a definition "SCP" as compared with the related art, so as to record the proxy type of the proxy entity. In addition, the NF instance ID field is used to record the instance ID of the proxy entity, the name field of the of service information about the NF is recorded as blank, the PLMN ID of the NF is used to record the PLMN ID of the proxy entity, and the field information is reported to the NRF through the NF registration request, so that the proxy entity registers its own NF profile.

In addition, like the other NF, the NF registration request further includes the address information and the configuration capability for the routing. The address information includes, but not limited to, an Internet Protocol (IP) address and a Fully Qualified Domain Name (FQDN). The configuration capability includes, but not limited to, priority, capacity, load, locality and ServingScope.

In addition, in the proxy communication method in the embodiments of the present disclosure, the NF registration request further includes the added field for recoding the function information about the proxy, the network status information about the network where the proxy entity is located and the entity information about the peripheral servable network entity. The function information about the proxy includes indirect communication or delegation discovery. The network status information includes bandwidth, rate, delay, buffer and message queuing. The entity information about the peripheral servable network entity includes an NF and/or a proxy.

In some possible embodiments of the present disclosure, when the proxy accesses to, and is registered in, a network, i.e., in the registration request transmitted by the proxy entity, the entity information about the peripheral servable network entity is blank or a preset value. The preset value is used to indicate an NF and/or a proxy to be served by the proxy.

Further, in some possible embodiments of the present disclosure, the entity information about the peripheral servable network entity is dynamically updated after entity information about a peripheral network has been obtained by the proxy entity. To be specific, the proxy entity inquires the NRF or a subscription status notification so as to obtain a latest peripheral servable NR and/or proxy, adds it into a parameter "entity information about the peripheral servable network entity", and updates a value of the parameter to the NRF through the profile update request, so as to maintain a latest value of the parameter on the NRF for the other NF or proxy. A specific procedure will be described hereinafter in more details.

In some possible embodiments of the present disclosure, the proxy entity may also transmit an NR status subscription request of NF management to the NRF, so as to register the other services of the NRF.

In the first embodiment of the present disclosure, as shown in FIG. 2, subsequent to S1111 of transmitting, by the proxy, the NF registration request of NF management to the NRF, the proxy communication method further includes: S1112 of storing, by the NRF, the NF profile, i.e., the profile information about the proxy entity in the registration request; and S1113 of transmitting, by the NRF, an NF registration response of NF management to the proxy.

Based on the above, it is able for the proxy to be registered on the NRF through calling the NF management service.

Second Embodiment

In S110, the proxy entity transmits the profile update request to the NRF entity in the first mode.

Figure 3:
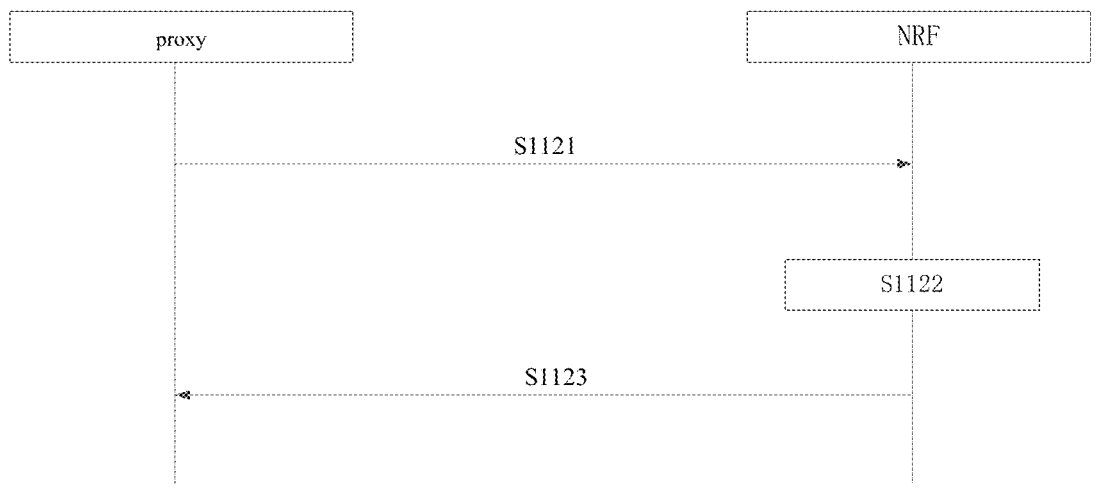
FIG. 3 is a flow chart of the proxy communication method according to a second embodiment of the present disclosure.

In this mode, the proxy entity is an SCP, and when it accesses to a network and its own information is updated, it is equivalent to an NF where a service is blank. Like the other NF, it needs to update its own profile information on the NRF. For example, the proxy entity reports its own NF instance ID to the NRF through an existing NF update service of NF management, so as to update its own NF profile. As shown in FIG. 3, a specific procedure includes: S1121 of transmitting, by the proxy, an NF update request, i.e., the management request in S110, of NF management to the NRF, the NF update request including the NF instance ID for recording an instance ID of the proxy entity and profile information to be updated; S1122 of updating, by the NRF, the corresponding profile information about the proxy entity in the NF update request; and S1123 of transmitting, by the NRF, an NF update response of NF management to the proxy.

In some possible embodiments of the present disclosure, in S1121, the profile information to be updated for the proxy includes entity information about a peripheral servable network entity. The entity information is updated to the NRF, so as to always maintain a latest value of the parameter on the NRF for the other NF or proxy.

Based on the above, it is able for the proxy to be updated on the NRF through calling the NF management service.

Third Embodiment

In S110, the proxy entity performs the de-registration on the NRF entity in the first mode.

Figure 4:
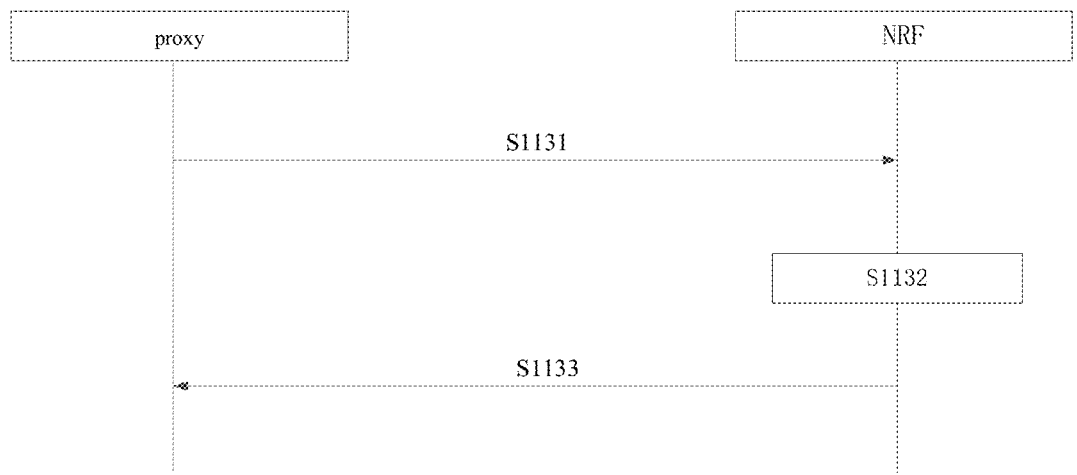
FIG. 4 is a flow chart of the proxy communication method according to a third embodiment of the present disclosure.

In this mode, when the proxy entity, e.g., an SCP, leaves a network, it is equivalent to an NF where a service is blank. Like the other NF, it needs to de-register its own profile information on the NRF. To be specific, an NF instance ID and indication information about a de-registration cause is reported to the NRF through an existing NF de-registration service of NF management, so as to complete the de-registration. As shown in FIG. 4, a specific procedure includes: S1131 of transmitting, by the proxy, an NF de-registration request, i.e., the management request in S110, of NF management to the NRF, the NF de-registration request including the NF instance ID for recording an instance ID of the proxy entity and the indication information about the de-registration cause; S1132 of marking, by the NRF, an unavailable status of the proxy entity and performing de-registration on the proxy entity; and S1133 of transmitting, by the NRF, an NR de-registration response of NF management to the proxy.

Based on the above, it is able for the proxy to be de-registered on the NRF through calling the NF management service.

Fourth Embodiment

In S110, the proxy entity transmits the registration request to the NRF entity in the second mode.

In this mode, a new set of NRF services, i.e., the proxy management services, are defined for the registration, updating or de-registration of the proxy.

Figure 5:
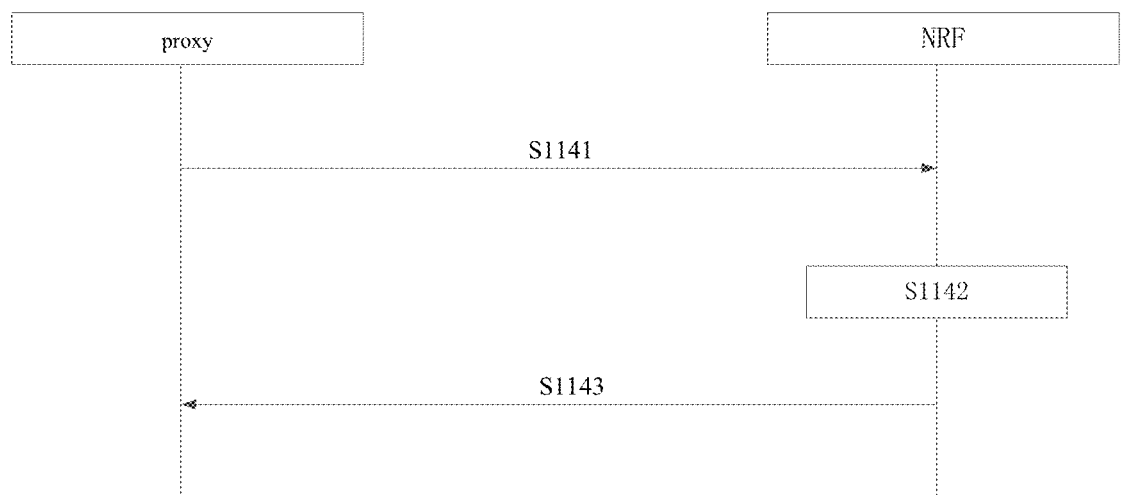
FIG. 5 is a flow chart of the proxy communication method according to a fourth embodiment of the present disclosure.

To be specific, during the registration of the proxy, a proxy registration service of proxy management is defined for the NRF, and when the proxy entity accesses to a network, the service is called to complete the registration of the profile information. As shown in FIG. 5, a procedure of transmitting, by the proxy entity, the registration request includes S1141 of transmitting, by the proxy, the proxy registration request, i.e., the management request in S110, of proxy management to the NRF.

In some possible embodiments of the present disclosure, the proxy registration request includes a proxy type, an instance ID, a PLMN ID, address information, configuration capability, function information about the proxy, network status information about a network where the proxy is located, and entity information about a peripheral servable network entity.

The proxy registration request specifically includes a proxy type field for recording the proxy type of the proxy entity, a proxy instance ID field for recording the instance ID of the proxy entity, a name field of the function information about the proxy for recording the function information about the proxy entity, a PLMN ID field for recording the PLMN ID of the proxy entity, and a proxy profile field for recording the configuration capability of the proxy entity, the network status information about the network where the proxy entity is located, and the entity information about the peripheral servable network entity.

The proxy entity provides its own proxy type, e.g., "SCP", through the proxy type field, provides its own proxy instance ID through the proxy instance ID field, provides the function information about the proxy, e.g., indirect communication or delegation discovery, through the name field of the function information about the proxy, and provides a PLMN ID of the proxy entity through the PLMN ID field, so as to register its own proxy profile.

Based on the above, content in the profile information includes content in an NF profile in a target specification, and a new proxy profile field is added. In some possible embodiments of the present disclosure, there is a plurality of proxy profile fields for recording the configuration capability of the proxy entity, the network status information about the network where the proxy is located and the entity information about the peripheral servable network entity.

The configuration capability includes, but not limited to, priority, capacity, load, locality and ServingScope. The network status information includes bandwidth, rate, delay, buffer and message queuing. The entity information about the peripheral servable network entity includes an NF and/or a proxy.

In some possible embodiments of the present disclosure, identical to that in the first embodiment, when the proxy accesses to, and is registered in, a network, i.e., in the registration request transmitted by the proxy entity, the entity information about the peripheral servable network entity is blank or a preset value. The preset value is used to indicate an NF and/or a proxy to be served by the proxy.

Further, in some possible embodiments of the present disclosure, the entity information about the peripheral servable network entity is dynamically updated after entity information about a peripheral network has been obtained by the proxy entity. To be specific, the proxy entity inquires the NRF or a subscription status notification so as to obtain a latest peripheral servable NR and/or proxy, adds it into a parameter "entity information about the peripheral servable network entity", and updates a value of the parameter to the NRF through the profile update request, so as to maintain a latest value of the parameter on the NRF for the other NF or proxy.

In a fourth embodiment of the present disclosure, as shown in FIG. 5, subsequent to S1141 of transmitting, by the proxy, the proxy registration request of proxy management to the NRF, the proxy communication method further includes: S1142 of storing, by the NRF, a proxy profile, i.e., the profile information about the proxy entity in the registration request; and S1143 of transmitting, by the NRF, a proxy registration response of proxy management to the proxy.

Based on the above, it is able for the proxy to be registered on the NRF through calling the proxy registration service of proxy management.

Fifth Embodiment

In S110, the proxy entity transmits the profile update request to the NRF entity in the second mode.

In this mode, a proxy update service of proxy management is defined for the NRF, and when the proxy entity has accessed to the network and the profile information is to be updated, the profile information about the proxy entity is updated through calling the service. To be specific, the proxy entity needs to provide its own proxy instance ID, and report the to-be-updated proxy profile.

Figure 6:
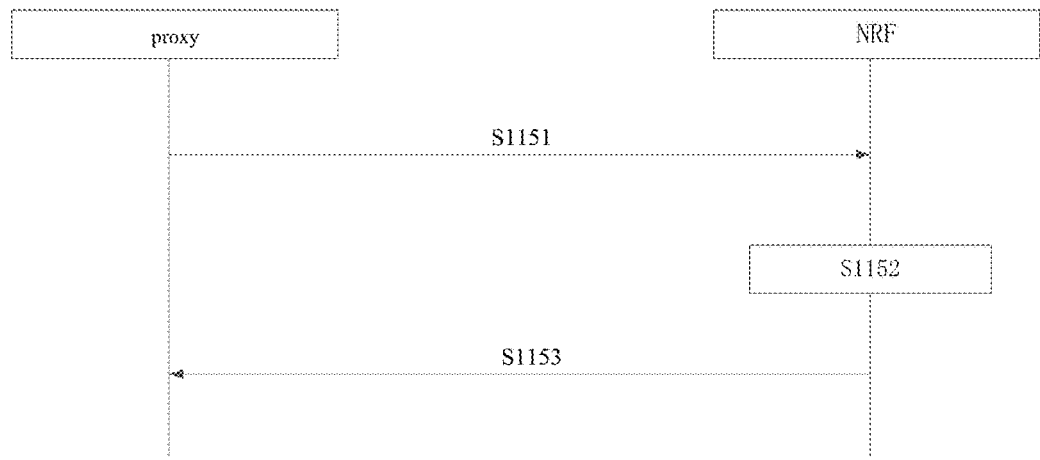
FIG. 6 is a flow chart of the proxy communication method according to a fifth embodiment of the present disclosure.

As shown in FIG. 6, a specific procedure includes: S1151 of transmitting, by the proxy, the proxy update request, i.e., the management request in S110, of proxy management to the NRF, the proxy update request including the proxy instance ID for recording the instance ID of the proxy entity and the to-be-updated profile information; S1152 of updating, by the NRF, the corresponding profile information about the proxy entity in the proxy update request; and S1153 of transmitting, by the NRF, a proxy update response of proxy management to the proxy.

In some possible embodiments of the present disclosure, in S1151, the to-be-updated profile information includes the entity information about the peripheral servable network entity, and the entity information is updated to the NRF, so as to always maintain a latest value of the parameter on the NRF for the other NF or proxy.

Based on the above, it is able for the proxy to update the profile on the NRF through calling the proxy management service.

Sixth Embodiment

In S110, the proxy entity performs the de-registration on the NRF entity in the second mode.

Figure 7:
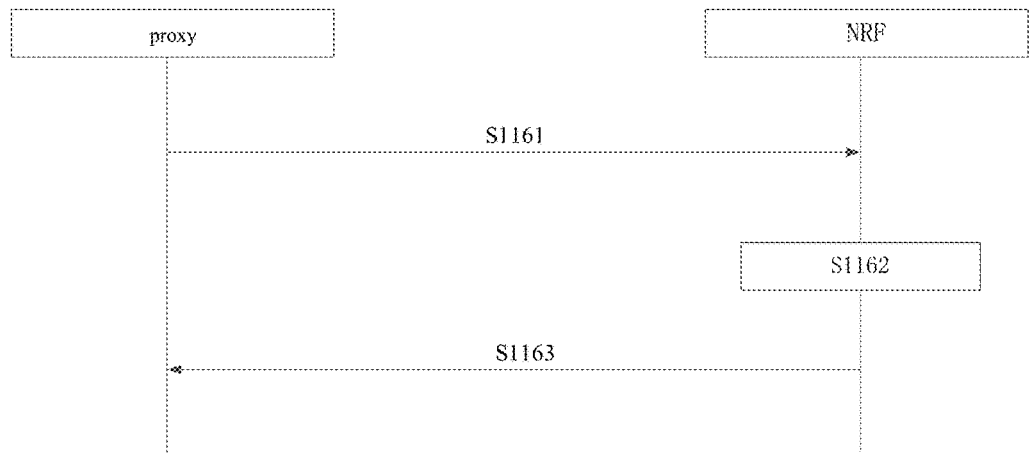
FIG. 7 is a flow chart of the proxy communication method according to a sixth embodiment of the present disclosure.

In this mode, a proxy de-registration service of proxy management is defined for the NRF, and when the proxy entity leaves the network, it calls the services to perform the de-registration. The proxy entity needs to provide its own instance ID and indication information about a de-registration cause. As shown in FIG. 7, a specific procedure includes: S1161 of transmitting, by the proxy, a proxy de-registration request, i.e., the management request in S110, of proxy management to the NRF, the proxy de-registration request including a proxy instance ID for recording an instance ID of the proxy entity, and the indication information about the de-registration cause; S1162 of marking, by the NRF, an unavailable status of the proxy entity, and performing the de-registration of the proxy entity; and S1163 of transmitting, by the NRF, a proxy de-registration response of proxy management to the proxy.

Based on the above, it is able for the proxy to perform the de-registration on the NRF through calling the proxy management service.

It should be appreciated that, when the registration of the proxy entity is performed in the above-mentioned first and second modes, the proxy entity may register the profile information to all the NRFs in a current network serving scope, i.e., register the profile information to a plurality of levels in a plurality of NRFs simultaneously.

Further, according to the proxy communication method in the embodiments of the present disclosure, it is also able for the proxy entity to inquire routing for the proxy entity, inquire a status notification service and determine next-hop routing information.

In some possible embodiments of the present disclosure, the proxy entity obtains the routing information about the proxy entity through at least one of inquiring the NRF or inquiring the status notification service for subscribing the NRF.

Hence, in some possible embodiments of the present disclosure, the proxy communication method further includes transmitting a routing query request to the NRF through an NF discovery service. The routing query request is used to request to obtain a field of a target routing type which is recorded as an NF or proxy.

In some possible embodiments of the present disclosure, the proxy communication method further includes obtaining response information returned by the NRF entity in response to the query request. The response information includes a target network entity, and the target network entity includes a target NF and/or a target proxy.

To be specific, for example, when a first proxy entity needs to inquire its own next-hop address (an NF or a proxy entity), the first proxy entity transmits a discovery query request to the NRF through an existing NF discovery service, so as to obtain the next-hop address (e.g., a second proxy entity, which is inquired by the first proxy entity because it has already been registered on the NRF in the first or fourth embodiment of the present disclosure, or an NF which is inquired by the first proxy entity because it has also already been registered on the NRF).

In this embodiment of the present disclosure, an NF type of the to-be-inquired target NF which should be inputted into the NF discovery service request is extended to a type of the target NF or target proxy, i.e., the to-be-requested target NF is an NF or proxy in the request. In this case, when the NRF includes the corresponding information, it should provide the target NF and the target proxy simultaneously. Also, the quantity of target proxies may be plural for the selection by the first proxy entity.

Seventh Embodiment

Figure 8:
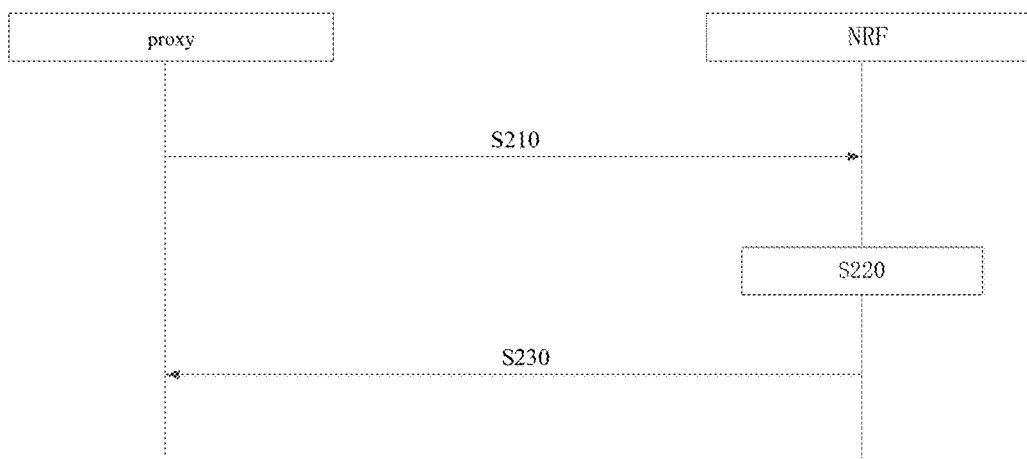
FIG. 8 is a flow chart of the proxy communication method according to a seventh embodiment of the present disclosure.

In this embodiment of the present disclosure, the proxy transmits the routing query request to the NRF so as to obtain the next-hop routing information. To be specific, as shown in FIG. 8, a specific procedure includes: S210 of transmitting, by the proxy, an NF discovery query request to the NRF, the NF discovery query request including the instance ID of the proxy; S220 of validating, by the NRF, an NF service or a proxy discovery; and S230 of returning, by the NRF, response information in response to the NF discovery query request, the response information including an inquired target network entity, and the target network entity including a target NF and/or a target proxy.

Based on the above, it is able for the proxy to inquire the next-hop address information through the NF discovery query service.

Eight Embodiment

In this embodiment of the present disclosure, the proxy inquires the next-hop address information through inquiring the status notification service for subscribing the NRF.

To be specific, when the proxy entity (e.g., a first proxy entity) accesses to a network, it is registered and subscribed as to an NF status subscription service on the NRF. When another proxy entity (e.g., a second proxy entity) is registered, updated or de-registered on the same NRF, the NRF notifies profile information about the second proxy entity to the first proxy entity through an NF status notification service in accordance with the subscribed NF status subscription service. Hence, it is able for the first proxy entity to obtain the profile information about the second proxy entity without any query request. Identically, when there is an NF registered, updated or de-registered on the NRF, the NRF transmits updated profile information about the NF to the first proxy entity.

Hence, based on the above, the first proxy entity obtains the profile information about the second proxy entity (the quantity of second proxy entities is one or more) and the target NF, and then determines the next-hop address information in accordance with the profile information.

Figure 9:
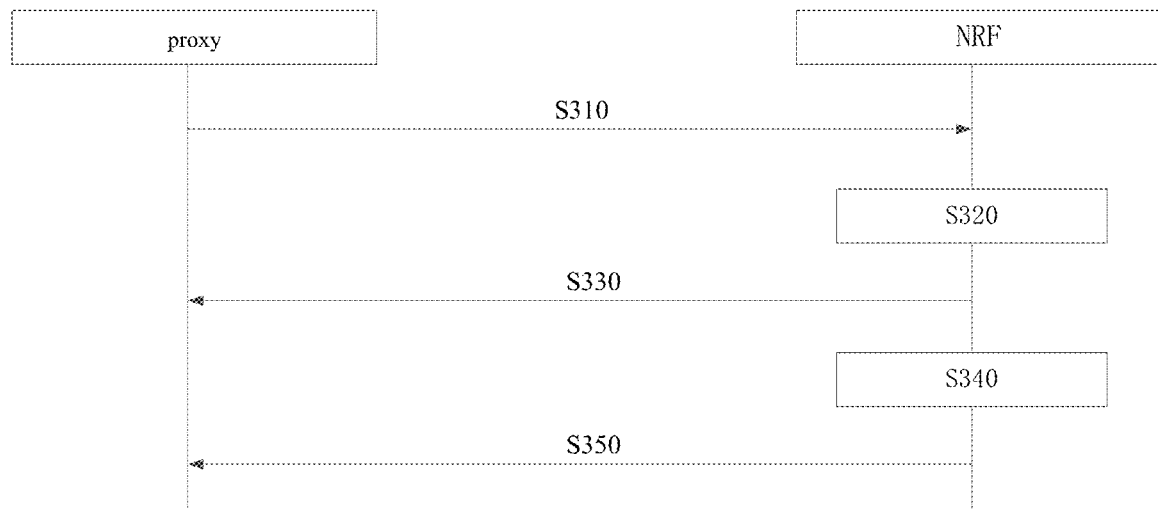
FIG. 9 is a flow chart of the proxy communication method according to an eighth embodiment of the present disclosure.

To be specific, as shown in FIG. 9, a specific procedure of inquiring, by the proxy, the next-hop address information through subscribing the NRF status notification service includes: S310 of transmitting, by the proxy, an NF status subscription request of NF management to the NRF; S320 of validating, by the NRF, an NF service or a proxy status subscription request; S330 of transmitting, by the NRF, response information to the proxy in response to the NF status subscription request; S340 of determining, by the NRF, latest registration, updating and de-registration of the NF and/or the proxy, and determining a target NF and/or a target proxy; and S350 of transmitting an NF status notification message of NF management to the proxy, the NF status notification message including updated profile information about the target NF and/or the target proxy.

Based on the above, it is able for the proxy to inquire the next-hop address information through subscribing the status notification service on the NRF.

In the above-mentioned seventh and eighth embodiments of the present disclosure, it is merely able for the proxy to obtain the information about the other NFs and proxies in a serving scope of the inquired NRF or a local NRF on which the status notification service has been subscribed. When the target NF or the target proxy for the proxy is not within the serving scope of the local NRF, e.g., in a cross-PLMN scenario, the proxy needs to inquire the information on the other NRF (e.g., an NRF2) outside the serving scope of the local NRF (e.g., an NRF1) through an N27 interface between the NRFs.

Figure 10:
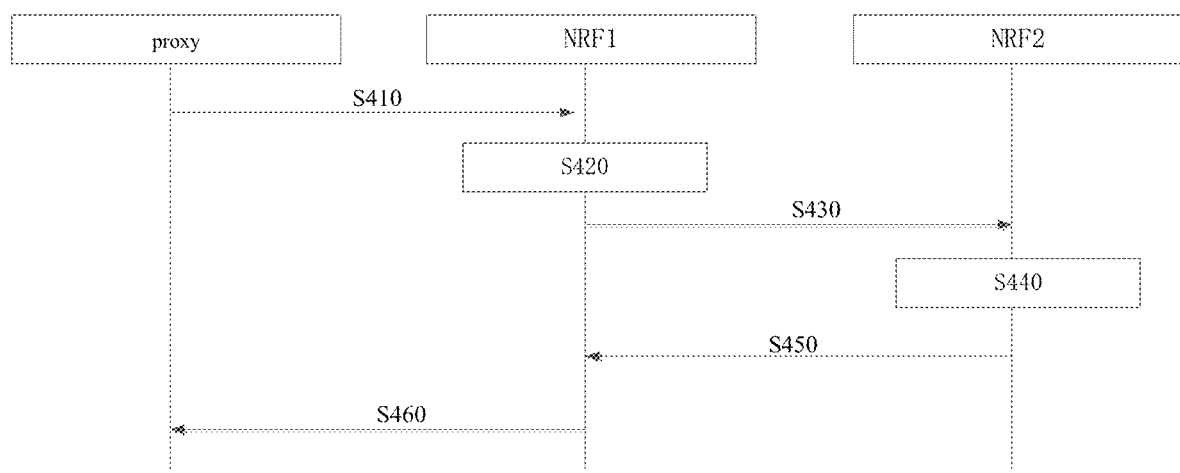
FIG. 10 is a flow chart of the proxy communication method according to a ninth embodiment of the present disclosure.

Hence, in a ninth embodiment of the present disclosure, in order to inquire the routing information in a cross-NRF manner, as shown in FIG. 10, a specific procedure includes: S410 of transmitting, by the proxy, an NF discovery query request to the NRF1, the NF discovery query request including the instance ID of the proxy and information about the inquired target NF or proxy; S420 of determining, by the NRF1, that the target NR or the target proxy inquired through the NF discovery query request has not been registered on the local NRF1 yet; S430 of transmitting, by the NRF1, an NF discovery query request to the NRF2; S440 of validating, by the NRF2, an NF service or a proxy discovery; S450 of returning, by the NRF2, response information to the NRF1 in response to the NF discovery query request, the response information including an inquired target network entity, the target network entity including a target NF and/or a target proxy; and S460 of transmitting, by the NRF1, the received response information including the target network entity to the proxy, so that the proxy determines the NF and/or proxy within the serving scope of the NRF2.

Based on the above, it is able for the proxy to determine the NF and/or proxy within the serving scope of the NRF2 after transmitting the NF discovery query request to the NRF1.

In some possible embodiments of the present disclosure, subsequent to obtaining the profile information about the target NF and/or the target proxy through transmitting the NF discovery query request to the NRF in the above-mentioned seventh or ninth embodiment of the present disclosure and subsequent to obtaining the profile information about the target NF and/or the target proxy through inquiring the status notification service in the above-mentioned eighth embodiment of the present disclosure, the proxy communication method further includes: updating the entity information about the peripheral servable network entity in accordance with the target NF and/or the target proxy; and transmitting a profile update request to the NRF so as to update the entity information about the peripheral servable network entity.

In this way, through updating the entity information to the NRF, it is able to always maintain a latest value of the parameter on the NRF for the other NF or proxy.

According to the proxy communication method in the embodiments of the present disclosure, after the proxy has been registered on the NRF, the proxy transmits the NF discovery query request to the NRF and subscribes the status notification service, so that it is capable of being found by the other NF and proxy. In addition, the proxy obtains the inquired profile information about the target NF and/or the target proxy on the NRF, so as to determine the next-hop routing information.

To be specific, the proxy communication method further includes determining the next-hop routing information in accordance with at least one of the profile information about the target NF and/or the target proxy in the response information, the profile information about the target NF and/or the target proxy in the NF status notification message, its own profile information or a network policy.

Through transmitting the NF discovery query request to the NRF and subscribing the status notification service on the NRF, the first proxy entity obtains an NF profile of the target NF and a proxy profile of the second proxy entity (the quantity of second proxy entities is one or more), so as to determine addresses and relevant parameters of the target NF and the second proxy entity.

For example, when the first proxy entity determines, through comparison, that it is more appropriate to forward information through the second proxy entity, the information may be forwarded through the second proxy entity, and when the first proxy entity determines that it is more appropriate to transmit the information directly, the first proxy entity may directly transmit the information to the target NF.

To be specific, the first proxy entity analyzes existing configuration capability parameters (e.g., priority, capacity, load, locality and ServingScope) in a current NF profile, latest NF profile and/or proxy profile parameters (e.g., the network status information and the entity information about the peripheral servable network entity), its own profile or a network policy, and then select the next-hop routing through a relevant algorithm.

Hence, in a tenth embodiment of the present disclosure, as shown in FIG. 11, a specific procedure includes: S510 of transmitting, by the first proxy entity, an NF discovery query request to the NRF or subscribing the status notification service on the NRF, so as to obtain profile information about a newly-added target NF and related second proxy entities; and S520 of determining, by the first proxy entity, a next-hop route in accordance with the existing configuration capability parameter in the current NF profile, the profile information about the newly-added NF and the second proxy entities, its own profile information and the network policy, the next-hop route including the target NF or one of the second proxy entities.

Based on the above, according to the proxy communication methods in the embodiments of the present disclosure, the proxy transmits the registration request, the profile update request and the de-registration request to the NRF, so that the NRF obtains the profile information about the proxy. Further, the proxy transmits the NF discovery query request to the NRF, subscribes the status notification service on the NRF, and inquires the NRF, so as to determine the next-hop routing information. In addition, based on the next-hop routing information, the proxy determines through a comprehensive comparison, a next-hop route in accordance with the existing configuration capability parameters in the current NF profile, the profile information about the newly-added NF and the second proxy entities, its own profile information and the network policy.

Hence, according to the proxy communication methods in the embodiments of the present disclosure, the proxy is registered, updated and/or de-registered on the NRF on its own initiative without any manual configuration like that in the related art, so it is able to reduce the human cost remarkably, deploy the proxy automatically, and achieve the network automation effectively.

The present disclosure further provides in some embodiments a proxy communication method for an NRF entity which, as shown in FIG. 12, includes S1201 of obtaining a management request from a proxy entity, the management request including at least one of a registration request, a profile update request or a de-registration request.

In some possible embodiments of the present disclosure, the management request includes one of the registration request, the profile update request and the de-registration request.

In some possible embodiments of the present disclosure, the management request includes the registration request, the profile update request and the de-registration request. When the management request includes the registration request, the profile update request and the de-registration request, subsequent to transmitting, by the proxy entity, the registration request to the NRF entity, the proxy communication method further includes transmitting the profile update request and/or the de-registration request to the NRF entity.

In some possible embodiments of the present disclosure, the registration request includes profile information about the proxy entity.

In some possible embodiments of the present disclosure, the profile information includes at least one of a proxy type, an instance ID, a PLMN ID, address information, configuration capability, function information about the proxy, network status information about a network where the proxy entity is located, or entity information about a peripheral servable network entity.

In some possible embodiments of the present disclosure, the obtaining the management request from the proxy entity includes one of obtaining the management request from the proxy entity through an NF management service, or obtaining the management request from the proxy entity through a proxy management service.

In some possible embodiments of the present disclosure, when the management request is obtained from the proxy entity through the NF management service and the management request includes the registration request, the registration request includes an NF type field for recording the proxy type of the proxy entity, an NF instance ID field for recording the instance ID of the proxy entity, a blank name field of service information about the NF, and an added field for recording the function information about the proxy, the network status information about the network where the proxy entity is located and the entity information about the peripheral servable network entity.

A specific procedure of obtaining the management request from the proxy entity through the NF management service may refer to that mentioned in the first embodiment of the present disclosure, and thus will not be particularly defined herein.

In some possible embodiments of the present disclosure, when the management request is obtained from the proxy entity through the proxy management service and the management request includes the registration request, the registration request includes a proxy type field for recording the proxy type of the proxy entity, a proxy instance ID field for recording the instance ID of the proxy entity, a name field of the function information about the proxy for recording the function information about the proxy entity, a PLMN ID field for recording the PLMN ID of the proxy entity, and a proxy profile field for recording the configuration capability of the proxy entity, the network status information about the network where the proxy entity is located, and the entity information about the peripheral servable network entity.

A specific procedure of obtaining the management request from the proxy entity through the proxy management service may refer to that mentioned in the fourth embodiment of the present disclosure, and thus will not be particularly defined herein.

In some possible embodiments of the present disclosure, in the registration request, the entity information about the peripheral servable network entity is blank or a preset value.

In some possible embodiments of the present disclosure, the proxy communication method further includes recording request information in the management service, and transmitting response information to the proxy entity in response to the management request.

When the management request is the registration request, the profile update request or the de-registration request, a specific procedure may refer to those mentioned in the first to sixth embodiments of the present disclosure, and thus will not be particular defined herein.

In some possible embodiments of the present disclosure, the proxy communication method further includes obtaining a routing query request transmitted by the proxy entity through an NF discovery service, and a field in the routing query request for requesting to obtain a target route type is recorded as the NF or proxy.

In some possible embodiments of the present disclosure, the proxy communication method further includes transmitting an information query request for a target NF and/or a target proxy to another NRF entity in accordance with the routing query request.

In the embodiments of the present disclosure, a specific procedure of transmitting, by the proxy entity, the routing query request to the NRF to perform the cross-NRF query may refer to that mentioned in the ninth embodiment of the present disclosure, and thus will not be particularly defined herein.

In some possible embodiments of the present disclosure, the proxy communication method further includes transmitting response information to the proxy entity in response to the routing query request, the response information includes a target network entity, and the target network entity includes a target NF and/or a target proxy.

In the embodiments of the present disclosure, a specific procedure of transmitting, by the proxy entity, the routing query request to the NRF and returning, by the NRF, the response information to the proxy entity in response to the query request may refer to that mentioned in the seventh embodiment of the present disclosure, and thus will not be particularly defined herein.

In some possible embodiments of the present disclosure, the proxy communication method further includes transmitting an NR status notification message to the proxy entity in accordance with a status subscription service requested by the proxy entity during the registration, and the NF status notification message includes updated profile information about the target NF and/or the target proxy.

In the embodiments of the present disclosure, a specific procedure of inquiring, by the proxy entity, the next-hop address information through subscribing the status notification service on the NRF may refer to that mentioned in the eighth embodiment of the present disclosure, and thus will not be particularly defined herein.

According to the proxy communication methods in the embodiments of the present disclosure, the proxy entity is registered, updated and/or de-registered on the NRF on its own initiative, so it is able for the proxy to perform the registration and routing on the NRF on its own initiative without any manual configuration like that in the related art, thereby to reduce the human cost remarkably.

The present disclosure further provides in some embodiments a network device which, as shown in FIG. 13, includes a processor 1300, a memory 1320 coupled to the processor 1300 through a bus interface 1330, and a transceiver 1310 coupled to the processor 1300 through the bus interface. The memory 1320 is configured to store therein programs and data for the operation of the processor. The transceiver 1310 is configured to transmit data information. The processor 1300 is configured to read the program in the memory 1320, so as to transmit a management request to an NRF entity, and the management request includes at least one of a registration request, a profile update request or a de-registration request.

In some possible embodiments of the present disclosure, the registration request includes profile information about the proxy entity.

In some possible embodiments of the present disclosure, the profile information includes at least one of a proxy type, an instance ID, a PLMN ID, address information, configuration capability, function information about the proxy, network status information about a network where the proxy entity is located, or entity information about a peripheral servable network entity.

In some possible embodiments of the present disclosure, the processor 1300 is configured to transmit the management request to the NRF entity through one of transmitting the management request to the NRF entity through an NF management service, or transmitting the management request to the NRF entity through a proxy management service.

In some possible embodiments of the present disclosure, when the management request is transmitted to the NRF entity through the NF management service and the management request includes the registration request, the registration request includes an NF type field for recording the proxy type of the proxy entity, an NF instance ID field for recording the instance ID of the proxy entity, a blank name field of service information about the NF, and an added field for recording the function information about the proxy, the network status information about the network where the proxy entity is located and the entity information about the peripheral servable network entity.

In some possible embodiments of the present disclosure, when the management request is transmitted to the NRF entity through the proxy management service and the management request includes the registration request, the registration request includes a proxy type field for recording the proxy type of the proxy entity, a proxy instance ID field for recording the instance ID of the proxy entity, a name field of the function information about the proxy for recording the function information about the proxy entity, a PLMN ID field for recording the PLMN ID of the proxy entity, and a proxy profile field for recording the configuration capability of the proxy entity, the network status information about the network where the proxy entity is located, and the entity information about the peripheral servable network entity.

In some possible embodiments of the present disclosure, in the registration request, the entity information about the peripheral servable network entity is blank or a preset value.

In some possible embodiments of the present disclosure, the processor 1300 is further configured to transmit a routing query request to the NRF through an NF discovery service, and a field in the routing query request for requesting to obtain a target route type is recorded as the NF or proxy.

In some possible embodiments of the present disclosure, the processor 1300 is further configured to obtain response information returned by the NRF in accordance with the routing query request, the response information includes a target network entity, and the target network entity includes a target NF and/or a target proxy.

In some possible embodiments of the present disclosure, the processor 1300 is further configured to obtain an NR status notification message from the NRF entity, and the NF status notification message includes updated profile information about the target NF and/or the target proxy.

In some possible embodiments of the present disclosure, when the profile information in the registration request includes the entity information about the peripheral servable network entity, the processor 1300 is further configured to: update the entity information about the peripheral servable network entity in accordance with the target NF and/or the target proxy; and transmit the profile update request to the NRF entity so as to update the entity information about the peripheral servable network entity.

In some possible embodiments of the present disclosure, the processor 1300 is further configured to determine next-hop routing information in accordance with at least one of the profile information about the target NF and/or the target proxy in the response information, the profile information about the target NF and/or the target proxy in the NF status notification message, own profile information, or a network policy.

In addition, in FIG. 13, bus architecture may include a number of buses and bridges connected to each other, so as to connect various circuits for one or more processors 1300 and one or more memories 1320. In addition, as is known in the art, the bus architecture may be used to connect any other circuits, such as a circuit for a peripheral device, a circuit for a voltage stabilizer and a power management circuit. The bus interface may be provided, and the transceiver 1310 may consist of a plurality of elements, i.e., a transmitter and a receiver for communication with any other devices over a transmission medium. The processor 1300 may take charge of managing the bus architecture as well as general processings. The memory 1320 may store therein data for the operation of the processor 1300.

Figure 14:
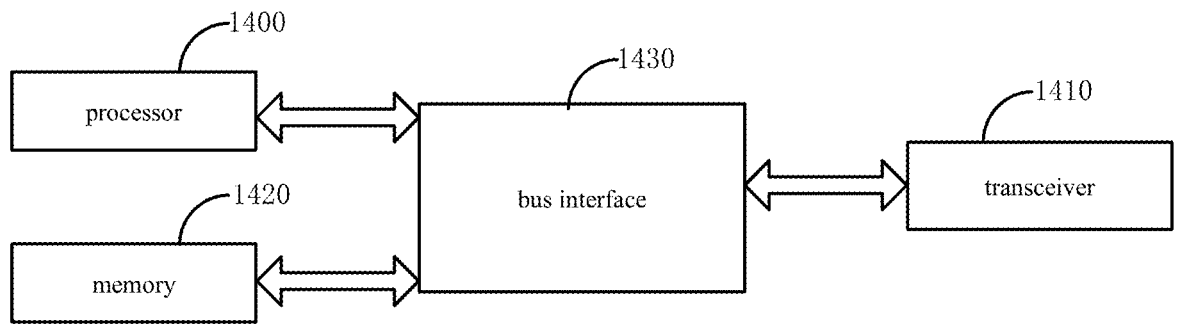
FIG. 14 is another schematic view showing the network device according to some embodiments of the present disclosure.

The present disclosure further provides in some embodiments a network device which, as shown in FIG. 14, includes a processor 1400, a memory 1420 coupled to the processor 1400 through a bus interface 1430, and a transceiver 1410 coupled to the processor 1400 through the bus interface. The memory 1420 is configured to store therein programs and data for the operation of the processor. The transceiver 1410 is configured to transmit data information. The processor 1400 is configured to read the program in the memory 1420 so as to obtain a management request from a proxy entity, and the management request includes at least one of a registration request, a profile update request or a de-registration request.

In some possible embodiments of the present disclosure, the registration request includes profile information about the proxy entity.

In some possible embodiments of the present disclosure, the profile information includes at least one of a proxy type, an instance ID, a PLMN ID, address information, configuration capability, function information about the proxy, network status information about a network where the proxy entity is located, or entity information about a peripheral servable network entity.

In some possible embodiments of the present disclosure, the processor 1400 is configured to obtain the management request from the proxy entity through one of obtaining the management request from the proxy entity through an NF management service, or obtaining the management request from the proxy entity through a proxy management service.

In some possible embodiments of the present disclosure, when the management request is obtained from the proxy entity through the NF management service and the management request includes the registration request, the registration request includes an NF type field for recording the proxy type of the proxy entity, an NF instance ID field for recording the instance ID of the proxy entity, a blank name field of service information about the NF, and an added field for recording the function information about the proxy, the network status information about the network where the proxy entity is located and the entity information about the peripheral servable network entity.

In some possible embodiments of the present disclosure, when the management request is obtained from the proxy entity through the proxy management service and the management request includes the registration request, the registration request includes a proxy type field for recording the proxy type of the proxy entity, a proxy instance ID field for recording the instance ID of the proxy entity, a name field of the function information about the proxy for recording the function information about the proxy entity, a PLMN ID field for recording the PLMN ID of the proxy entity, and a proxy profile field for recording the configuration capability of the proxy entity, the network status information about the network where the proxy entity is located, and the entity information about the peripheral servable network entity.

In some possible embodiments of the present disclosure, in the registration request, the entity information about the peripheral servable network entity is blank or a preset value.

In some possible embodiments of the present disclosure, the processor 1400 is further configured to record request information in the management service, and transmit response information to the proxy entity in response to the management request.

In some possible embodiments of the present disclosure, the processor 1400 is further configured to obtain a routing query request transmitted by the proxy entity through an NF discovery service, and a field in the routing query request for requesting to obtain a target route type is recorded as the NF or proxy.

In some possible embodiments of the present disclosure, the processor 1400 is further configured to transmit an information query request for a target NF and/or a target proxy to another NRF entity in accordance with the routing query request.

In some possible embodiments of the present disclosure, the processor 1400 is further configured to transmit response information to the proxy entity in response to the routing query request, the response information includes a target network entity, and the target network entity includes a target NF and/or a target proxy.

In some possible embodiments of the present disclosure, the processor 1400 is further configured to transmit an NR status notification message to the proxy entity in accordance with a status subscription service requested by the proxy entity during the registration, and the NF status notification message includes updated profile information about the target NF and/or the target proxy.

In addition, in FIG. 14, bus architecture may include a number of buses and bridges connected to each other, so as to connect various circuits for one or more processors 1400 and one or more memories 1420. In addition, as is known in the art, the bus architecture may be used to connect any other circuits, such as a circuit for a peripheral device, a circuit for a voltage stabilizer and a power management circuit. The bus interface may be provided, and the transceiver 1410 may consist of a plurality of elements, i.e., a transmitter and a receiver for communication with any other devices over a transmission medium. The processor 1400 may take charge of managing the bus architecture as well as general processings. The memory 1420 may store therein data for the operation of the processor 1400.

Figure 15:
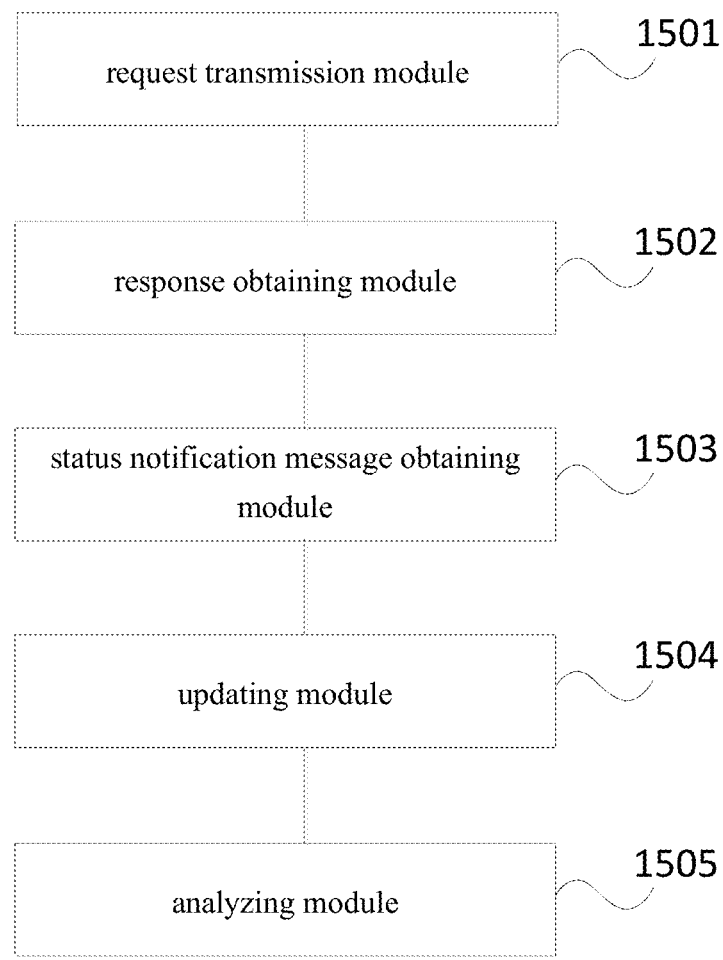
FIG. 15 is a schematic view showing a proxy communication device according to some embodiments of the present disclosure.

The present disclosure further provides in some embodiments a proxy communication device for a proxy entity which, as shown in FIG. 15, includes a request transmission module 1501 configured to transmit a management request to an NRF entity, and the management request includes at least one of a registration request, a profile update request or a de-registration request.

In some possible embodiments of the present disclosure, the registration request includes profile information about the proxy entity.

In some possible embodiments of the present disclosure, the profile information includes at least one of a proxy type, an instance ID, a PLMN ID, address information, configuration capability, function information about the proxy, network status information about a network where the proxy entity is located, or entity information about a peripheral servable network entity.

In some possible embodiments of the present disclosure, the request transmission module 1501 is configured to transmit the management request to the NRF entity through one of transmitting the management request to the NRF entity through an NF management service, or transmitting the management request to the NRF entity through a proxy management service.

In some possible embodiments of the present disclosure, when the management request is transmitted to the NRF entity through the NF management service and the management request includes the registration request, the registration request includes an NF type field for recording the proxy type of the proxy entity, an NF instance ID field for recording the instance ID of the proxy entity, a blank name field of service information about the NF, and an added field for recording the function information about the proxy, the network status information about the network where the proxy entity is located and the entity information about the peripheral servable network entity.

In some possible embodiments of the present disclosure, when the management request is transmitted to the NRF entity through the proxy management service and the management request includes the registration request, the registration request includes a proxy type field for recording the proxy type of the proxy entity, a proxy instance ID field for recording the instance ID of the proxy entity, a name field of the function information about the proxy for recording the function information about the proxy entity, a PLMN ID field for recording the PLMN ID of the proxy entity, and a proxy profile field for recording the configuration capability of the proxy entity, the network status information about the network where the proxy entity is located, and the entity information about the peripheral servable network entity.

In some possible embodiments of the present disclosure, in the registration request, the entity information about the peripheral servable network entity is blank or a preset value.

In some possible embodiments of the present disclosure, the request transmission module 1501 is further configured to transmit a routing query request to the NRF through an NF discovery service, and a field in the routing query request for requesting to obtain a target route type is recorded as the NF or proxy.

In some possible embodiments of the present disclosure, the proxy communication device further includes a response obtaining module 1502 configured to obtain response information returned by the NRF in accordance with the routing query request, the response information includes a target network entity, and the target network entity includes a target NF and/or a target proxy.

In some possible embodiments of the present disclosure, the proxy communication device further includes a status notification message obtaining module 1503 configured obtain an NR status notification message from the NRF entity, and the NF status notification message includes updated profile information about the target NF and/or the target proxy.

In some possible embodiments of the present disclosure, when the profile information in the registration request includes the entity information about the peripheral servable network entity, the proxy communication device further includes an updating module 1504 configured to update the entity information about the peripheral servable network entity in accordance with the target NF and/or the target proxy, and the request transmission module 1501 is further configured to transmit the profile update request to the NRF entity so as to update the entity information about the peripheral servable network entity.

In some possible embodiments of the present disclosure, the proxy communication device further includes an analyzing module 1505 configured to determine next-hop routing information in accordance with at least one of the profile information about the target NF and/or the target proxy in the response information, the profile information about the target NF and/or the target proxy in the NF status notification message, own profile information, or a network policy.

Figure 16:
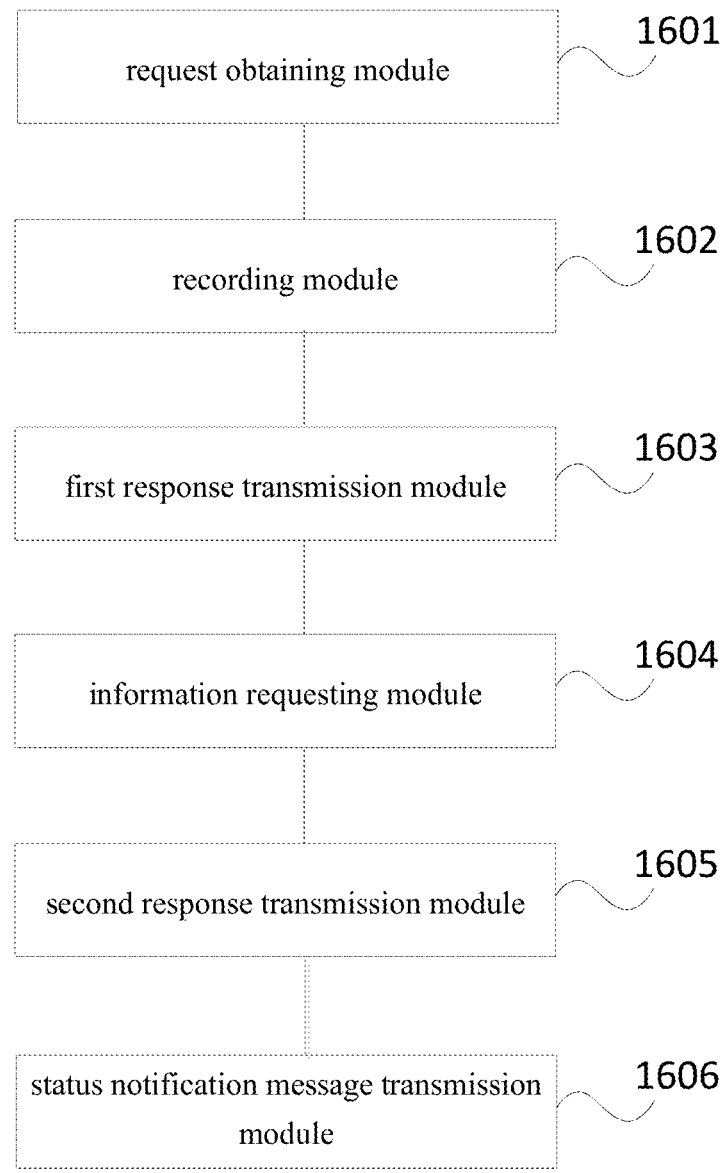
FIG. 16 is another schematic view showing the proxy communication device according to some embodiments of the present disclosure.

The present disclosure further provides in some embodiments a proxy communication device for an NRF entity which, as shown in FIG. 16, includes a request obtaining module 1601 configured to obtain a management request from a proxy entity, and the management request includes at least one of a registration request, a profile update request or a de-registration request.

In some possible embodiments of the present disclosure, the registration request includes profile information about the proxy entity.

In some possible embodiments of the present disclosure, the profile information includes at least one of a proxy type, an instance ID, a PLMN ID, address information, configuration capability, function information about the proxy, network status information about a network where the proxy entity is located, or entity information about a peripheral servable network entity.

In some possible embodiments of the present disclosure, the obtaining the management request from the proxy entity includes one of obtaining the management request from the proxy entity through an NF management service, or obtaining the management request from the proxy entity through a proxy management service.

In some possible embodiments of the present disclosure, when the management request is obtained from the proxy entity through the NF management service and the management request includes the registration request, the registration request includes an NF type field for recording the proxy type of the proxy entity, an NF instance ID field for recording the instance ID of the proxy entity, a blank name field of service information about the NF, and an added field for recording the function information about the proxy, the network status information about the network where the proxy entity is located and the entity information about the peripheral servable network entity.

In some possible embodiments of the present disclosure, when the management request is obtained from the proxy entity through the proxy management service and the management request includes the registration request, the registration request includes a proxy type field for recording the proxy type of the proxy entity, a proxy instance ID field for recording the instance ID of the proxy entity, a name field of the function information about the proxy for recording the function information about the proxy entity, a PLMN ID field for recording the PLMN ID of the proxy entity, and a proxy profile field for recording the configuration capability of the proxy entity, the network status information about the network where the proxy entity is located, and the entity information about the peripheral servable network entity.

In some possible embodiments of the present disclosure, in the registration request, the entity information about the peripheral servable network entity is blank or a preset value.

In some possible embodiments of the present disclosure, the proxy communication device further includes: a recording module 1602 configured to record request information in the management service; and a first response transmission module 1603 configured to transmit response information to the proxy entity in response to the management request.

In some possible embodiments of the present disclosure, the request obtaining module 1601 is further configured to obtain a routing query request transmitted by the proxy entity through an NF discovery service, and a field in the routing query request for requesting to obtain a target route type is recorded as the NF or proxy.

In some possible embodiments of the present disclosure, the proxy communication device further includes an information requesting module 1604 configured to transmit an information query request for a target NF and/or a target proxy to another NRF entity in accordance with the routing query request.

In some possible embodiments of the present disclosure, the proxy communication device further includes a second response transmission module 1605 configured to transmit response information to the proxy entity in response to the routing query request, the response information includes a target network entity, and the target network entity includes a target NF and/or a target proxy.

In some possible embodiments of the present disclosure, the proxy communication device further includes a status notification message transmission module 1606 configured to transmit an NR status notification message to the proxy entity in accordance with a status subscription service requested by the proxy entity during the registration, and the NF status notification message includes updated profile information about the target NF and/or the target proxy.

The present disclosure further provides in some embodiments a processor-readable storage medium storing therein a program. The program is executed by a processor so as to implement the above-mentioned proxy communication methods with a same technical effect, which will thus not be particularly defined herein.

The processor-readable storage medium is Read-Only Memory (ROM), Random Access Memory (RAM), magnetic disk or optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

It should be appreciated that, units and steps described in the embodiments of the present disclosure are implemented in the form of electronic hardware, or a combination of a computer program and the electronic hardware. Whether or not these functions are executed by hardware or software depends on specific applications or design constraints of the technical solution. Different methods are adopted with respect to the specific applications so as to achieve the described functions, without departing from the scope of the present disclosure.

It should be further appreciated that, for convenience and clarification, operation procedures of the system, device and units described hereinabove refer to the corresponding procedures in the method embodiment, and thus will not be particularly defined herein.

It should be further appreciated that, the device and method are implemented in any other ways. For example, the embodiments for the apparatus are merely for illustrative purposes, and the modules or units are provided merely on the basis of their logic functions. During the actual application, some modules or units are combined together or integrated into another system. Alternatively, some functions of the module or units are omitted or not executed. In addition, the coupling connection, direct coupling connection or communication connection between the modules or units is implemented via interfaces, and the indirect coupling connection or communication connection between the modules or units is implemented in an electrical or mechanical form or in any other form.

The units are, or are not, physically separated from each other. The units for displaying are, or are not, physical units, i.e., they are arranged at an identical position, or distributed on a plurality of network elements. Parts or all of the units are selected in accordance with the practical need, so as to achieve the purpose of the present disclosure.

In addition, the functional units in the embodiments of the present disclosure are integrated into a processing unit, or the functional units exist independently, or two or more functional units are combined together.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the method in the embodiments of the present disclosure.

It should be further appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM.

It should be further appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The description has been given hereinabove in conjunction with the drawings and the embodiments, but the present disclosure shall not be limited to the above preferred embodiments. These embodiments are for illustrative purposes only, but shall not be used to limit the scope of the present disclosure. A person skilled in the art may make various alternations or modifications without departing from the spirit of the present disclosure and the scope defined in the appended claims, which also fall within the scope of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A proxy communication method performed by a proxy entity, comprising:
transmitting a management request to a Network Repository Function (NRF) entity, the management request comprising at least one of a registration request or a de-registration request,
wherein the registration request comprises profile information about the proxy entity,
wherein the transmitting the management request to the NRF entity comprises one of: transmitting the management request to the NRF entity through a Network Function (NF) management service, or transmitting the management request to the NRF entity through a proxy management service,
wherein when the management request is transmitted to the NRF entity through the NF management service and the management request comprises the registration request,
the registration request comprises: (i) an NF type field for recording the proxy type of the proxy entity, (ii) an NF instance ID field for recording the instance ID of the proxy entity, (iii) a blank name field of service information about the NF, (iv) an added field for recording the function information about the proxy entity, (v) the network status information about the network where the proxy entity is located, and (vi) the entity information about the peripheral servable network entity; or,
wherein when the management request is transmitted to the NRF entity through the proxy management service and the management request comprises the registration request,
the registration request comprises: (i) a proxy type field for recording the proxy type of the proxy entity, (ii) a proxy instance ID field for recording the instance ID of the proxy entity, (iii) a name field of the function information about the proxy for recording the function information about the proxy entity, (iv) a PLMN ID field for recording the PLMN ID of the proxy entity, (v) a proxy profile field for recording the configuration capability of the proxy entity, (vi) the network status information about the network where the proxy entity is located, and (vii) the entity information about the peripheral servable network entity.

2. The proxy communication method according to claim 1, wherein the profile information comprises at least one of: function information about the proxy, network status information about a network where the proxy entity is located, entity information about a peripheral servable network entity, a proxy type, an instance Identifier (ID), a Public Land Mobile Network (PLMN) ID, address information, or configuration capability.

3. The proxy communication method according to claim 1, wherein in the registration request, the entity information about the peripheral servable network entity is blank or a preset value.

4. The proxy communication method according to claim 1, further comprising:
mode A,
transmitting a routing query request to the NRF through an NF discovery service, wherein a field in the routing query request for requesting to obtain a target route type is recorded as the NF or proxy; or
mode B,
obtaining an NR status notification message from the NRF entity, wherein the NF status notification message comprises updated profile information about the target NF and/or the target proxy.

5. The proxy communication method according to claim 4, further comprising:

in mode A, obtaining response information returned by the NRF in accordance with the routing query request, wherein the response information comprises a target network entity, and the target network entity comprises a target NF and/or a target proxy; or in mode B, when the profile information in the registration request comprises the entity information about the peripheral servable network entity, the proxy communication method further comprises:

updating the entity information about the peripheral servable network entity in accordance with the target NF and/or the target proxy; and transmitting the profile update request to the NRF entity so as to update the entity information about the peripheral servable network entity.

6. The proxy communication method according to claim 5, further comprising:

determining next-hop routing information in accordance with at least one of the profile information about the target NF and/or the target proxy in the response information, the profile information about the target NF and/or the target proxy in the NF status notification message, own profile information, or a network policy.

7. A proxy communication method performed by a Network Repository Function (NRF) entity, comprising:

obtaining a management request from a proxy entity, the management request comprising at least one of a registration request or a de-registration request, wherein the registration request comprises profile information about the proxy entity, wherein the obtaining the management request from the proxy entity comprises one of:

obtaining the management request from the proxy entity through a Network Function (NF) management service, or obtaining the management request from the proxy entity through a proxy management service, wherein when the management request is obtained from the proxy entity through the NF management service and the management request comprises the registration request, the registration request comprises: (i) an NF type field for recording the proxy type of the proxy entity, (ii) an NF instance ID field for recording the instance ID of the proxy entity, (iii) a blank name field of service information about the NF, (iv) an added field for recording the function information about the proxy entity, (v) the network status information about the network where the proxy entity is located, and (vi) the entity information about the peripheral servable network entity; or, wherein when the management request is obtained from the proxy entity through the proxy management service and the management request comprises the registration request, the registration request comprises; (i) a proxy type field for recording the proxy type of the proxy entity, (ii) a proxy instance ID field for recording the instance ID of the proxy entity, iii) a name field of the function information about the proxy for recording the function information about the proxy entity, (iv) a PLMN ID field for recording the PLMN ID of the proxy entity, (v) a proxy profile field for recording the configuration capability of the proxy entity, (vi) the network status information about the network where the proxy entity is located, and (vii) the entity information about the peripheral servable network entity.

8. The proxy communication method according to claim 7, wherein the profile information comprises at least one of: function information about the proxy, network status information about a network where the proxy entity is located, entity information about a peripheral servable network entity, a proxy type, an instance Identifier (ID), a Public Land Mobile Network (PLMN) ID, address information, or configuration capability.

9. The proxy communication method according to claim 7, wherein in the registration request, the entity information about the peripheral servable network entity is blank or a preset value.

10. The proxy communication method according to claim 7, further comprising:

mode C, recording request information in the management service, and transmitting response information to the proxy entity in response to the management request; or mode D, obtaining a routing query request transmitted by the proxy entity through an NF discovery service, wherein a field in the routing query request for requesting to obtain a target route type is recorded as the NF or proxy.

11. The proxy communication method according to claim 10, further comprising:

in mode C, transmitting an information query request for a target NF and/or a target proxy to another NRF entity in accordance with the routing query request; or in mode D, transmitting response information to the proxy entity in response to the routing query request, wherein the response information comprises a target network entity, and the target network entity comprises a target NF and/or a target proxy.

12. The proxy communication method according to claim 7, further comprising:

transmitting an NR status notification message to the proxy entity in accordance with a status subscription service requested by the proxy entity during the registration, wherein the NF status notification message comprises updated profile information about the target NF and/or the target proxy.

13. A Network Repository Function (NRF) entity device, comprising a transceiver, a memory, a processor, and a program stored in the memory and executed by the processor, wherein the processor is configured to read the program in the memory, so as to realize the proxy communication method according to claim 7.

14. A proxy entity device, comprising a transceiver, a memory, a processor, and a program stored in the memory and executed by the processor, wherein the processor is configured to read the program in the memory, so as to transmit a management request to a Network Repository Function (NRF) entity, and the management request comprises at least one of a registration request or a de-registration request, wherein the registration request comprises profile information about the proxy entity, wherein the transmitting the management request to the NRF entity comprises one of: transmitting the management request to the NRF entity through a Network Function (NF) management service, or transmitting the management request to the NRF entity through a proxy management service, wherein when the management request is transmitted to the NRF entity through the NF management service and the management request comprises the registration request, the registration request comprises: (i) an NF type field for recording the proxy type of the proxy entity, (ii) an NF instance ID field for recording the instance ID of the proxy entity, (iii) a blank name field of service information about the NF, (iv) an added field for recording the function information about the proxy entity, (v) the network status information about the network where the proxy entity is located, and (vi) the entity information about the peripheral servable network entity; or, wherein when the management request is transmitted to the NRF entity through the proxy management service and the management request comprises the registration request, the registration request comprises: (i) a proxy type field for recording the proxy type of the proxy entity, (ii) a proxy instance ID field for recording the instance ID of the proxy entity, (iii) a name field of the function information about the proxy for recording the function information about the proxy entity, (iv) a PLMN ID field for recording the PLMN ID of the proxy entity, (v) a proxy profile field for recording the configuration capability of the proxy entity, (vi) the network status information about the network where the proxy entity is located, and (vii) the entity information about the peripheral servable network entity.

* * * * *